Dec. 1, 1953     W. R. PETERSON     2,661,122
MILK MEASURING AND MATERIAL FEEDING DEVICE
Filed Dec. 29, 1948     3 Sheets-Sheet 1
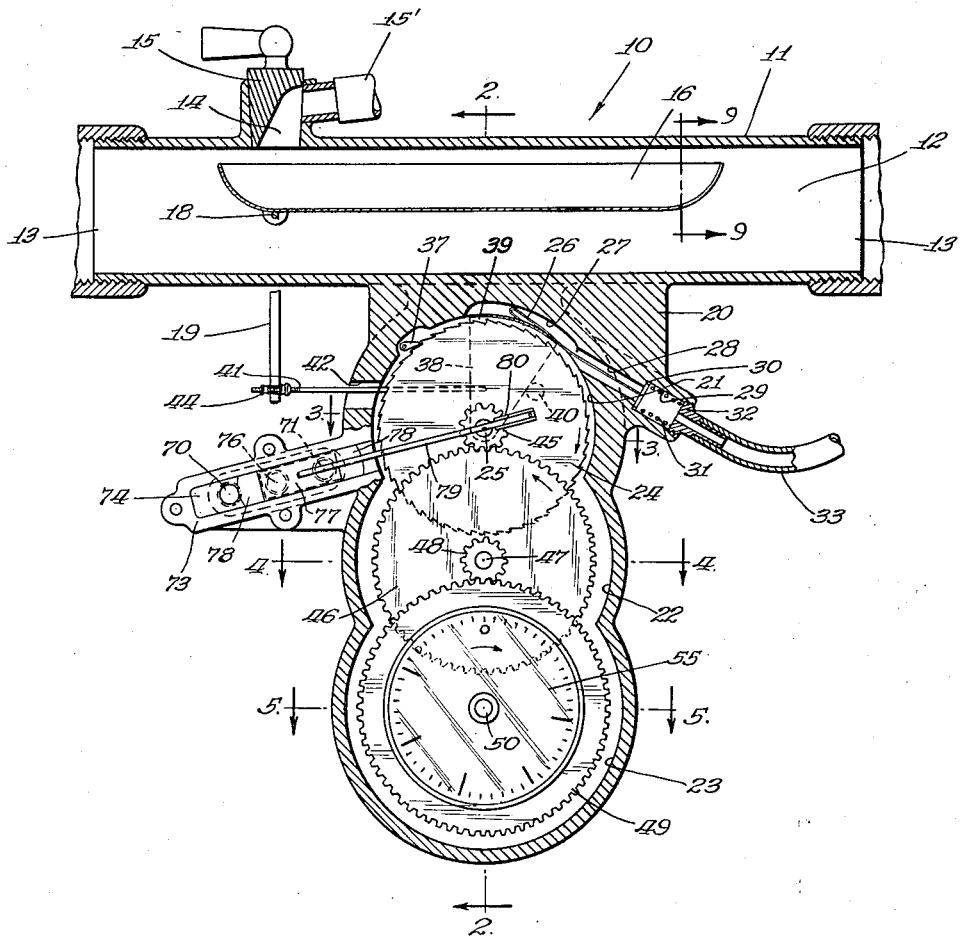
Inventor.
Walter R. Peterson Dec. 1, 1953     W. R. PETERSON     2,661,122
MILK MEASURING AND MATERIAL FEEDING DEVICE
Filed Dec. 29, 1948     3 Sheets-Sheet 2
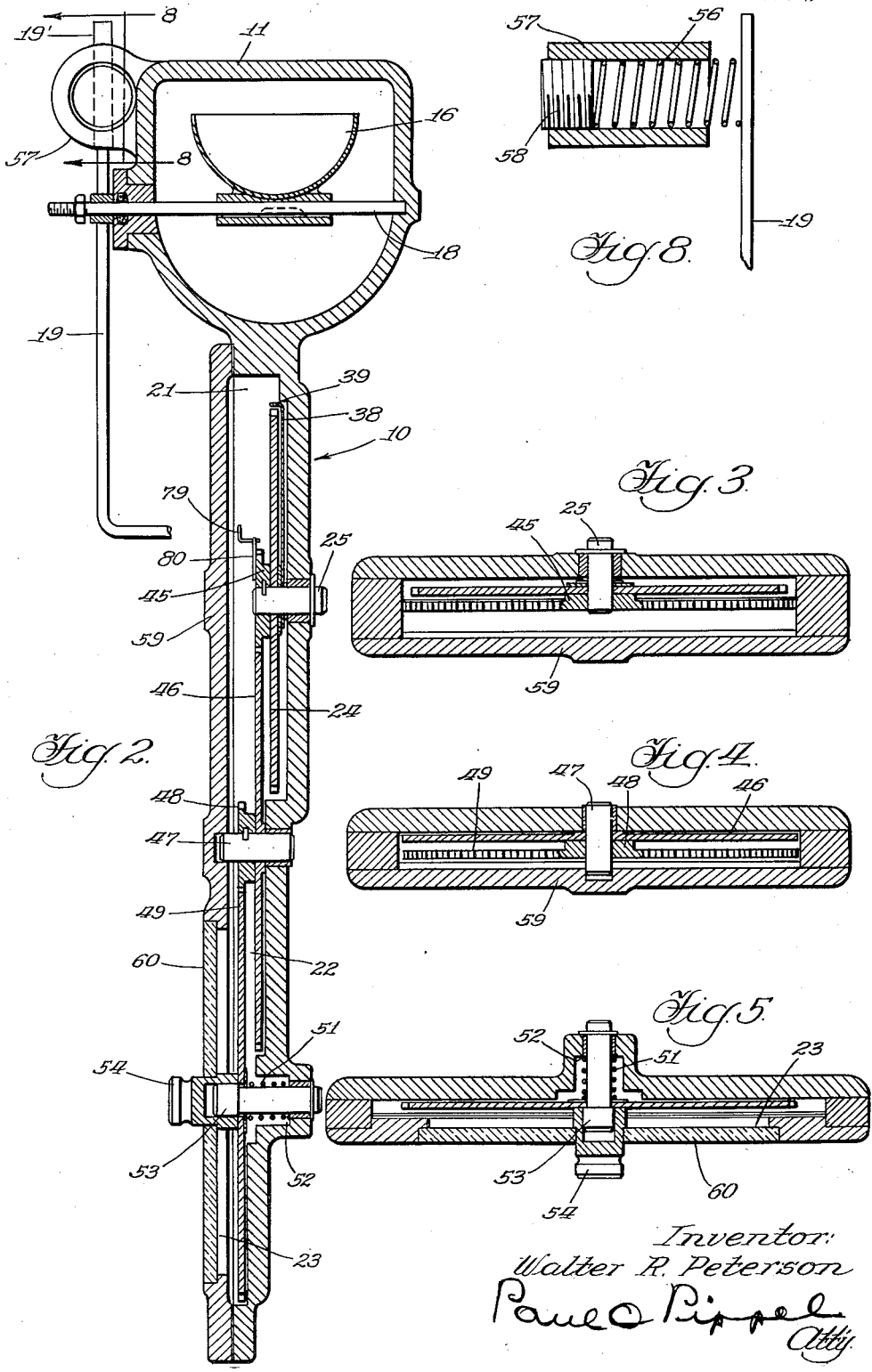

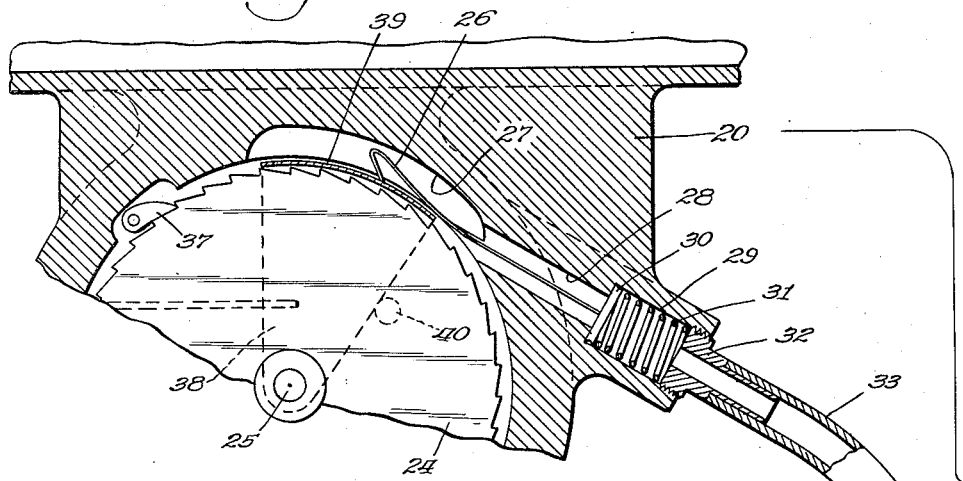
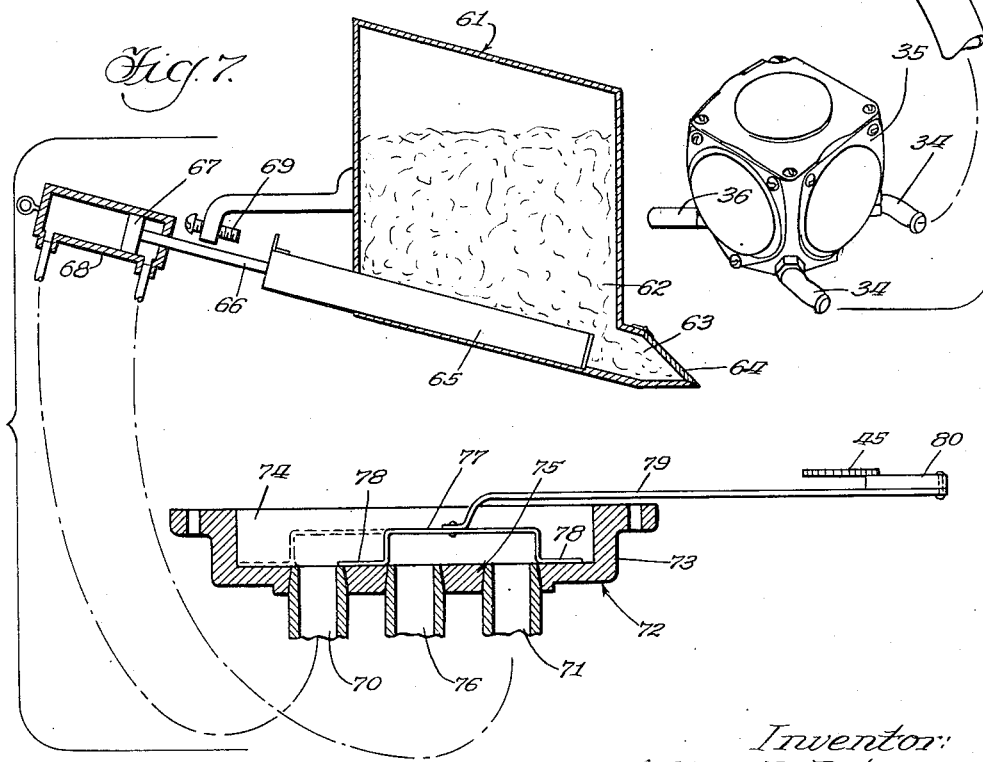

Patented Dec. 1, 1953

2,661,122

UNITED STATES PATENT OFFICE 2,661,122

MILK MEASURING AND MATERIAL FEEDING DEVICE

Walter R. Peterson, Hinsdale, Ill., assignor to International Harvester Company, a corporation of New Jersey Application December 29, 1948, Serial No. 67,893

9 Claims. (Cl. 222—32)

This invention relates to a liquid measuring device and more specifically to an apparatus for measuring milk flow. More specifically the invention relates to a milk volume measuring device operable to control and dispense a quantity of feed and to distribute the same to the particular milk-producing animal whose milking production is being simultaneously measured by the device.

In the dairy husbandry art it has now been recognized that an accurate device for measuring milk production is greatly desired. In general, where only a few cows are kept, it is relatively simple to measure the production of each individual cow as the milker pails are filled; however, in large dairy farms the problem becomes quite difficult since a number of cows may be simultaneously milked and since the milk, as it leaves the milker unit, is immediately directed to a main pipe line gathering the milk simultaneously from all the cows as they are milked. It is desirable therefore to measure the production of each cow before the milk enters into the pipe line system. By knowing accurately the quantity production of each cow it is comparatively simple to determine the amount of feed that should be furnished to the cow each day. By scientifically measuring the individual cow milk production and thereupon supplying the cow with a sufficient quantity of feed directly proportional to its production, the milk production of the particular animal can be greatly increased and the food distribution may be accurately and economically controlled. It is the prime object, therefore, of this invention to provide an improved measuring apparatus for measuring the milk production of a dairy animal.

It is another object to provide a measuring and indicating apparatus for accurately measuring and indicating the quantity of liquid produced by a cow during the milking operation.

A still further object is to provide a measuring and indicating device for measuring the milk production of a dairy animal, said device including a rotatable ratchet means adapted to move an indicating member, the ratchet means being operable by a pulsating device of a type normally used for operating the teat cups of a milker unit.

A still further object is to provide a measuring device for accurately measuring the milk production of a dairy animal, the measuring device including a dispensing apparatus simultaneously operable by the device to dispense and feed a proportional amount of food to the animal with relation to its milk production.

A still further object is to provide a measuring apparatus for a milker unit, said apparatus including a vacuum driven pawl having shielding means arranged between the ratchet and the pawl for varying the working stroke of the pawl during the operation of the same.

These and other objects will become more readily apparent upon the reading of the description when examined in connection with the accompanying drawings.

In the drawings:

Fig. 1 is a cross-sectional view through a milk measuring and material feeding device.

Fig. 2 is a cross-sectional view through the device of Fig. 1 substantially along the line 2—2 of Fig. 1.

Fig. 3 is a cross-sectional view taken substantially along the line 3—3 of Fig. 1.

Fig. 4 is a sectional view taken substantially along the line 4—4 of Fig. 1.

Fig. 5 is a sectional view taken substantially along the line 5—5 of Fig. 1.

Fig. 6 is an enlarged cross-sectional view of a portion of a milk measuring device shown in Fig. 1, said view having a schematic connection to a pulsating mechanism.

Fig. 7 is a schematic view of a dispensing mechanism cooperating with and having a valve connection shown in section, the valve connection also being shown in Fig. 1.

Fig. 8 is a cross-sectional view taken along the line 8—8 of Fig. 2 through a resilient restraining member for a milk measuring device.

Fig. 9 is a sectional view through a trough, along line 9—9 of Fig. 1, showing a weir at one end of the trough.

Referring particularly to Figs. 1 and 2, a liquid measuring and feeding apparatus is generally indicated by the reference character 10. The apparatus 10 includes a casing 11. The casing 11 may be in the form of a conduit open at both ends and having a chamber 12. The chamber 12 is provided with outlet openings 13. The casing 11 may be considered as a portion of a piping system extending through a dairy barn and having a plurality of measuring devices 10 connected thereto, preferably one at each cow stall. In the illustration only one unit is, of course, shown and for the purpose of explanation the interior of the conduit will be considered as a chamber 12. The chamber 12 is provided with an inlet opening or boss 14 which is adapted to be opened and closed by means of a cock 15. The inlet opening 14 is normally attached to a milk hose 15' which, in turn, may be connected to a teat cup cluster, not shown, of a milker unit. A liquid receiving member or trough 16 is positioned within the chamber 12. The trough 16 includes a weir 17 at one end. The trough 16 is rigidly secured to a shaft 18 which extends transversely of the casing 11 and permits hinging of the trough about a horizontal axis. The shaft 18, in turn, is connected to a vertically extending arm or link 19, and during hinging movement of the trough the link 19 also is adapted to swing about the shaft 18.

A casing 20 projects downwardly from the casing 11. The casing 20 is provided with a plurality of annular chambers 21, 22, and 23. The casing 21 encloses a ratchet wheel or rotated member 24. The ratchet wheel 24 is adapted to rotate with a stub shaft 25 journaled on the casing 20. The ratchet 24 is rotated by means of a pawl 26 which, in the illustration shown, may consist of a relatively thin hook-shaped member of spring material which is adapted to reciprocate within a recess 27 and a bore 28 formed in the casing 20.

A cylinder 29 is formed in the casing 20 adjacent the bore 28, the cylinder containing for reciprocation therein a piston 30. The piston 30 is connected to one end of the pawl 26 for moving the pawl. A spring 31 normally forces the piston 30 to the position shown in Figs. 1 and 6. A connecting plug 32 is screwed into one end of the cylinder 29 and the connecting plug 32 is in communication with a flexible conduit 33. The conduit 33, as best shown in Fig. 6, is connected to an outlet 34 connecting with a pulsating or air evacuating mechanism 35. The pulsating mechanism 35 is of a type that is generally utilized in connection with teat cups of a milker unit, not shown. The pulsating mechanism may be of the type shown in the F. G. Hodsdon Patent 2,129,765, patented September 13, 1938. The pulsator is operable to provide for a vacuum depression within the conduit 33 and the cylinder 29 in an intermittent cycle, the stroke alternately being an atmosphere stroke and a vacuum stroke in a manner that is well known in the function of pulsating mechanisms. The pulsator is also provided with the conventional type of vacuum connection 36 which, in turn, leads to a vacuum pump, not shown. A holding pawl 37 holds the ratchet wheel 24 against counter-clockwise rotation.

Upon each vacuum stroke of the pulsator 35 the piston 30 moves the length of the cylinder 29, thereby also actuating the pawl 26. The working stroke of the pawl 26 is fixed and the travel or distance thereof is constant with each reciprocation of the piston 30. In order to limit the working stroke of the pawl 26 in its relation with respect to the ratchet 24, a shielding or limiting means 38 is provided. The shielding means includes a triangularly-shaped element which is pivotally connected to the stub shaft 25. The shielding means 38 includes a horizontally extending flange 39 which is adapted to be moved into position between the pawl 26 and the teeth of the ratchet 24. A stop 40 limits the clockwise movement of the shielding means 38. A link 41 is pivotally connected to the shielding means 38 and extends through an opening 42 formed in the casing 20. The link 41 is adapted to be reciprocated by means of the vertically extending arm 19. An adjustment 44 is provided for moving the arm 19 along the portion of the length of the link 41.

A pinion 45 is securely connected to the stub shaft 25 for rotation therewith. As the ratchet 24 rotates the pinion 45 is also rotating, said pinion being in meshing engagement with a gear 46. The gear 46 is secured to a stub 47 journaled on a portion of the casing 20 within the chamber 22. A pinion 48 is, in turn, secured to the stub shaft 47 and, in turn, is in meshing engagement with a gear 49. The gear 49 is loosely journaled on a stub shaft 50, the stub shaft 50 being journaled on the casing 20 within the chamber 23. A spring 51 is seated on the inner surface of a boss 52, the spring urging the gear 49 against a shoulder 53 so that the shaft 50 is also rotated during rotation of the gear 49. A knob 54 is slid over the enlargement 53 of the shaft 50, and the knob 54 may be forced inwardly against the gear 49 to disengage the gear from engagement with the shoulder 53. By thus pressing inwardly on the knob 54, the gear 49 may be forced inwardly to compress the spring 51, whereupon the gear 49 is disengaged from the pinion 48. The gear 49 also may contain indices or indicating means as best shown in Fig. 1, the purpose of which will presently become more apparent.

As previously indicated the link or arm 19 may pivot on the shaft 18 in response to the hinging movement of the trough 16. When the trough hinges due to the influence of liquid, it hinges downwardly against the action of a spring 56 which is compressed by the upper portion 19' of the arm 19. The spring is mounted on a boss 57, the spring tension being adjustable by means of a set screw 58 as best shown in Fig. 8. By adjusting the spring 56 the position of the trough may be angularly changed. The spring continually urges the trough back to its balanced condition against the flow of liquid to the trough.

A cover 59 is placed over the casing 20 to enclose chambers 21, 22, and 23. A transparent disk 60, as best shown in Fig. 2, is placed over the lower chamber 23 to permit ready viewing of the indices or signals of a dial 55.

As best shown in Fig. 7, a feeding and dispensing mechanism is generally referred to by the numeral 61. The mechanism 61 includes a receptacle 62 having at one end a feed opening 63. The dispensing mechanism 61 may readily be placed adjacent the forward end of a cow stall and the opening 63 may be so arranged that feed, dispensed through said opening, will fall upon the feed table of the stall. The opening 63 may be covered by a hinged flap 64. A plunger 65 is positioned for reciprocation within the receptacle 62 and the plunger is so arranged that it will push material, such as feed, within the receptacle out through the opening 63. The plunger 65 is connected to a piston rod 66 extending from a piston 67 enclosed within a cylinder 68. An adjustable stop 69 is provided for adjusting the length of the stroke of the plunger 65. The cylinder 68 is of the two-way type and includes conduits 70 and 71 positioned respectively at the ends of the cylinder. The illustration in Fig. 7 is schematic and shows the conduits 70 and 71 in communication with a valve or control member 72. The control member 72 includes a casing 73 which, as shown in Fig. 1, may be a part of the casing 20. The casing 73 includes a chamber 74, said chamber 74 having a slide surface 75. Conduits 70 and 71 are arranged to be placed in communication with the chamber 74. The vacuum conduit 76 may, in turn, be connected to a constant source of vacuum, such as a pump or vacuum chamber (not shown). A slide valve 77 is adapted to reciprocate on the surface 75, the slide valve being of U-shaped construction and including outwardly extending flanges 78. The valve is arranged to alternately place the conduits 70 and 71 in communication with the conduit 76 whereby the conduits 70 and 71 may be intermittently placed under a vacuum depression for effecting reciprocation of the piston 67 within the cylinder 68. The slide valve 77 is reciprocated by means of an arm 79 which, as best shown in Figs. 1 and 7, extends to the pinion 45 of the ratchet 24. The pinion 45 is provided with a crank arm 80 which is pivotally connected to the arm 79 and upon rotation of the crank arm 80 imparts reciprocating movement to the arm 79 and the slide valve 77.

In the operation, the casing 11 may form a part of pipe line running through a dairy barn. In such an installation a measuring apparatus 10 is placed at each cow stall. It is, of course, also readily apparent that the measuring apparatus may also be utilized in a barn where the cows, during the milking operation, merely walk through a stall whereupon they are milked in succession rather than simultaneously. In such an installation only one measuring apparatus need be employed. The whole milk gathered from the teat cups enters into the chamber 12 through the inlet opening 14. The milk thereupon courses through the trough 16 and out through the weir 17, whereupon it may leave the chamber 12 by means of the openings 13. The pulsating mechanism 35 is operating to intermittently create a vacuum depression within the cylinder 29. During each vacuum depression the piston 30 is moved in one direction in the cylinder and the pawl 26 is thereupon also moved. Immediately after the piston 30 has thus been moved the conduit 33 and cylinder 29 are in communication with the atmosphere through the structure of the conventional type of pulsator whereupon the vacuum in the cylinder 29 is destroyed. The spring 31 is thereupon effective to return the piston 30 and the pawl 26 to their former position. It can readily be seen that upon each vacuum stroke of the pulsating mechanism 35 the piston 30 is moved a fixed length, thus, in turn, providing for a fixed stroke of the pawl 26. Thus, as the pawl 26 engages the ratchet 24, the ratchet would be normally advanced a fixed distance.

The distance of rotation upon each working stroke of the pawl 26 is, however, governed by means of the limiting or shielding means 38. The flange 39 of the shielding means 38 is normally effective to cover a given predetermined number of teeth and it may be interposed between the pawl 26 and the ratchet to limit the effective working stroke of the pawl 26. Thus, the movement of the ratchet 24 is entirely dependent and governed by the position of the shield 38. In other words, although the distance of the working stroke of the pawl 26 is fixed, the effectiveness of the pawl in moving the ratchet is entirely dependent on the position of the shielding means 38. For example, the pawl may normally advance the ratchet by ten teeth upon each working movement of the pawl 26. The shield 38 may thereupon be pivoted to cover six of the teeth so that the pawl 26 may only effectively move the ratchet four teeth since during the other portion of its working stroke it is sliding on the flange 39 of the shielding means. The speed and distance of rotation of the ratchet are, therefore, dependent on the position of the shielding means 38 with respect to the pawl 26.

As the ratchet 24 is rotating it in turn rotates the gear 46 through the pinion 45. The gear 46 in turn rotates the gear 49 thus in turn rotating the dial 55 containing the markings or indices. The markings of indices may be utilized to represent pounds of milk that may flow through the trough 16 from the particular cow whose production it is desired to measure. The dial rotates in response to the movement of the ratchet 24 and thus the number of revolutions of the ratchet 24 indicate the quantity of milk that the particular cow has delivered. As the whole milk flows over the trough 16 and out through the weir 17, the trough 16 pivots downwardly in proportion to the flow of milk therethrough. As the trough position hinges downwardly the link 19 is effective by means of the link 41 to move the shielding member 38 in a counter-clockwise direction. As the shielding member 38 is moved in a counter-clockwise direction a greater number of teeth on the ratchet 24 are exposed. As a greater number of teeth are thus exposed, the fixed stroke action of the pawl 26 is effective to rotate the ratchet 24 a greater distance. It is, of course, obvious as the ratchet 24 is moved a greater distance it will result in additional movement of the dial 55 thereupon indicating that a greater volume of milk is coursing through the weir 17. The indices on the dial may be arranged to indicate the maximum amount of milk that may be taken from one animal. The ratio of the gears with respect to the dial and the movement of the pawl 26 is so correlated that an accurate quantity reading of the milk may be obtained, depending, of course, on the movement of the shielding means in response to the position of the trough 16. When no milk is flowing through the trough 16 the shielding means 38 is positioned over against the stop 40 and actuation of the pawl 26 will only result in its sliding upon the flange 39 without any engagement with the ratchet wheel; however, as soon as milk starts flowing through the trough 16 the shielding means 38 will be moved counter-clockwise and teeth will be exposed whereupon the ratchet rotates and the indices will indicate the amount or volume of milk flowing through the apparatus. The pivotal movement of the trough 16 from its horizontal position is against the action of the spring 56 which normally urges the trough to remain in its balanced horizontal position. The spring tension is so correlated that when a certain amount of liquid flows through the trough 16, the trough overcomes the spring and thus assumes an angular position with its attendant result on the position of the shielding member 38. Prior to the use of the apparatus the operator merely presses upon the knob 54 pushing the gear 49 and dial inwardly thereupon disengaging the gear 49 from engagement with the pinion 48. The operator can thus freely manipulate the dial so that the reading can be returned to zero. The spring 51 thereupon pushes against the gear 49 reengaging said gear with the pinion 48 whereupon the operation of the mechanism can again take place.

Simultaneously with the milk measuring operation it is desired to feed the cow a proper proportion of feed. The amount of feed to be fed to the cow is dependent upon its milk production and a feeding device 61, as shown in Fig. 7, in combination with the measuring apparatus 10 effectively assures that a proper amount of feed is fed in proportion to the milk production of the animal. As the ratchet wheel 24 is rotated the crank arm 80 reciprocates the arm 79 in turn moving the slide valve 77 for alternately placing the conduits 70 and 71 in communication with the vacuum line or conduit 76. In the position shown in Figs. 1 and 7, the conduit 71 is in communication with conduit 76 by means of the slide valve 77. Thus a vacuum depression has been effected in the cylinder 68 whereupon the piston 67 has been moved to the position shown, whereby material or feed within the receptacle 62 has been forced outwardly through the opening 63 by means of the plunger 65. As the ratchet 24 continues to advance to a position 180° from the position shown in Fig. 1, the slide valve moves to a position wherein the conduit 70 is in communication with the conduit 76. A vacuum depression is therefore created in the conduit 70 and in the cylinder 68 forcing the piston 67 rearwardly in the cylinder. The plunger 65 is thereupon retracted until it engages the adjustable stop 69. Upon one complete revolution of the ratchet 24 the slide valve 77 is again returned to the position shown in Fig. 7 and the vacuum within the conduit 71 is effective to again cause the piston 65 to move forwardly thus, in turn, pushing feed through the opening 63. Food thus dispensed falls upon a stall feeding table so that the cow may be supplied with a sufficient amount of feed during the milking and measuring operation. It is, of course, obvious that during any one milking and measuring operation the amount of feed thus fed is dependent upon the number of revolutions of the ratchet 24. The number of revolutions being, of course, dependent upon the amount of milk flow through the weir 16. Thus a cow producing forty-three pounds of milk would receive a greater amount of feed than a cow producing thirty-two pounds of milk. In this manner a proper proportion of feed in relation to the milk production of the cow is dispensed. It can readily be seen, therefore, that the dairy operation is provided with a scientific and effective measuring apparatus that will give an accurate reading of the number of pounds that are delivered by the cow at the same time automatic and scientific feeding means are provided to feed the animal with the required amount of nourishment. Where the diary establishment consists of a large farm, including a considerable number of stalls, the measuring and dispensing mechanism may be arranged at each stall and the cows may be simultaneously milked, and an accurate reading may be obtained from each measuring apparatus.

It can readily be seen that the objects of the invention have been fully achieved and that a novel measuring and dispensing apparatus is provided. It is, of course, readily apparent that changes and modifications may be made which do not depart from the spirit of the invention as disclosed nor the scope thereof as defined in the appended claims.

What is claimed is:

1. A device of the character described comprising a casing having a liquid inlet opening, a trough hingedly connected within said casing for receiving liquids from said inlet opening, biasing means connected to said trough for normally urging said trough to maintain the trough in the horizontal position, said trough being normally balanced in a horizontal position and tiltable about the horizontal axis during the flow of liquid therethrough, said trough including a ratchet wheel, a pawl engageable with ratchet wheel, a cylinder having a piston for reciprocation therein, means connecting said pawl, pressure means arranged for reciprocating said piston whereby said pawl is movable in a fixed working stroke for rotating said ratchet wheel a fixed distance, shielding means movable between said pawl and said ratchet wheel for limiting the distance of the working stroke thereby limiting the distance of rotation of said ratchet wheel, and means for moving said shielding means including linkage connected to said shielding means and said trough whereby movement of said trough in response to the flow of liquid therethrough is imparted to said shielding means.

2. A combined fluid measuring and dispensing device comprising a casing having a liquid inlet opening, a trough hingedly connected within said casing for receiving liquids from said inlet opening, said trough including a weir, a ratchet wheel, a pawl engageable with said ratchet wheel, a cylinder having a piston for reciprocation therein, means connecting said piston to said pawl, pressure means arranged for reciprocating said piston whereby said pawl is movable in a fixed working stroke for rotating said ratchet a fixed distance, shielding means movable between said pawl and said ratchet for limiting the distance of the working stroke thereby limiting the distance of rotation of said ratchet, means for moving said shielding means including linkage connected to said shielding means and said trough whereby movement of said trough in response to the flow of liquid therethrough is imparted to said shielding means, a dispensing mechanism including a material receptacle, a reciprocating plunger movable within said container for dispensing materials, and means for reciprocating said plunger in relation to the movement of said ratchet wheel, said means including a pressure mechanism connected to said plunger, a valve mechanism for regulating pressure to said mechanism, and linkage means connected to said ratchet wheel for controlling said valve mechanism whereby the quantity of material dispensed is related to the flow of liquid through said trough.

3. A combined fluid measuring and dispensing device comprising a casing having a liquid inlet opening, a trough hingedly connected within said casing for receiving liquids from said inlet opening, said trough including a weir, a ratchet wheel, a pawl engageable with said ratchet wheel, a cylinder having a piston for reciprocation therein, means connecting said piston to said pawl, pressure means arranged for reciprocating said piston whereby said pawl is movable in a fixed working stroke for rotating said ratchet wheel a fixed distance, shielding means movable between said pawl and said ratchet wheel for limiting the distance of the working stroke thereby limiting the distance of rotation of said ratchet wheel, means for moving said shielding means including linkage connected to said shielding means and said trough whereby movement of said trough in response to the flow of liquid therethrough is imparted to said shielding means, a dispensing mechanism including a material receptacle, means movable for dispensing material from said receptacle, and means connected to said ratchet wheel for regulating the movement of said movable means whereby the quantity of material dispensed is related to the flow of liquid through said trough.

4. A combined fluid measuring and dispensing device comprising a casing having a liquid inlet opening, a trough hingedly connected within said casing for receiving liquids from said inlet opening, said trough including a weir, a ratchet wheel, a pawl engageable with said ratchet wheel, a cylinder having a piston for reciprocation therein, means connecting said piston to said pawl, pressure means arranged for reciprocating said piston whereby said pawl is movable in a fixed working stroke for rotating said ratchet wheel a fixed distance, shielding means movable between said pawl and said ratchet wheel for limiting the distance of the working stroke thereby limiting the distance of rotation of said ratchet wheel, means for moving said shielding means including linkage connected to said shielding means and said trough whereby movement of said trough in response to the flow of liquid therethrough is imparted to said shielding means, a dispensing mechanism including a material receptacle, pressure means movable for dispensing material from said receptacle, and valve means associated with said ratchet wheel for regulating the movement of said movable means whereby the quantity of material dispensed is related to the movement of said ratchet wheel and the flow of liquid through said trough.

5. A liquid measuring apparatus comprising in combination, a casing having liquid inlet and outlet openings, a trough hingedly positioned within the casing for movement about a horizontal axis, said trough including a weir, biasing means connected to said trough for normally urging said trough to maintain a horizontal position for receiving liquid, said trough being angularly tiltable about said horizontal axis during the flow of liquid from said trough through said weir, an indicating means including a ratchet wheel, means for rotating said ratchet wheel including a cylinder having a piston movable therein, a pulsating mechanism connected to said cylinder, said pulsating mechanism being arranged to intermittently provide for a vacuum depression in said cylinder thereby moving said piston in one direction, resilient means for moving said piston in a second direction, a pawl connected to said piston, said pawl being movable with said piston and having a fixed working stroke thereby engaging said ratchet wheel and moving the same a fixed distance during each movement of the piston in one direction, shielding means movable to a number of positions between said ratchet wheel and said pawl, said shielding means being constructed and arranged to limit the working stroke of said pawl and the engagement of said ratchet wheel by the pawl thereby limiting the distance of movement of said ratchet wheel, and means for moving said shield in response to the flow of liquid through said weir, said means including a linkage connected to said shield and said trough, and an indicating means responsive to the movement of said ratchet wheel for indicating the flow of liquid.

6. A liquid measuring apparatus comprising in combination, a casing having liquid inlet and outlet openings, a trough hingedly positioned within the casing, said trough including a weir, biasing means connected to said trough for normally urging said trough to maintain a horizontal position for receiving liquid, said trough being angularly tiltable about a horizontal axis during the flow of liquid from said trough through said weir, an indicating means including a ratchet wheel, means for rotating said ratchet wheel including a cylinder having a piston movable therein, a pulsating mechanism connected to said cylinder for moving the piston, a pawl connected to said piston, said pawl being movable with said piston and having a fixed working stroke thereby engaging said ratchet wheel and moving the same a fixed distance during each movement of the piston in one direction, shielding means movable to a number of positions with respect to said ratchet wheel and said pawl, said shielding means being constructed and arranged to limit the working stroke of said pawl and the engagement of said ratchet wheel by the pawl thereby limiting the distance of movement of said ratchet wheel, and means for moving said shield in response to the flow of liquid through said weir, said means including a linkage connected to said shield and said trough, and an indicating means responsive to the movement of said ratchet wheel for indicating the flow of liquid.

7. A liquid measuring apparatus comprising in combination, a casing having liquid inlet and outlet openings, a trough hingedly positioned within the casing for movement about a horizontal axis, said trough including a weir, biasing means connected to said trough for normally urging said trough to maintain a horizontal position for receiving liquid, said trough being angularly tiltable about said horizontal axis during the flow of liquid from said trough through said weir, an indicating means including a ratchet wheel, means for rotating said ratchet wheel including a cylinder having a piston movable therein, a pulsating mechanism connected to said cylinder, said pulsating mechanism being arranged to intermittently provide for a vacuum depression in said cylinder thereby moving said piston, a pawl connected to said piston, said pawl being movable with said piston and having a fixed working stroke thereby engaging said ratchet wheel and moving the same a fixed distance during each movement of the piston in one direction, shielding means movable to a number of positions between said ratchet wheel and said pawl, said shielding means being constructed and arranged to limit the working stroke of said pawl and the engagement of said ratchet wheel by the pawl thereby limiting the distance of movement of said ratchet wheel, and means for moving said shield in response to the flow of liquid through said weir, said means including a linkage connected to said shield and said trough, and an indicating means responsive to the movement of said ratchet wheel for indicating the flow of liquid.

8. A combined fluid measuring and dispensing device comprising a trough, means supporting said trough for hinging movement about a horizontal axis, inlet means for directing liquid to said trough, said trough having a weir, a dispensing mechanism including a material receptacle having a dispensing opening, a reciprocating plunger for discharging materials from said receptacle through said discharge opening, means for reciprocating said plunger including a cylinder, a ram within said cylinder connected to said plunger, first and second conduits connected to said cylinder on opposite sides of said ram, a valve mechanism, said valve mechanism including a first connection adapted to connect to a source of vacuum, and second and third connections respectively connected to said first and second vacuum conduits, a valve member movable to alternately connect said first connection with said second and third connections whereupon said ram and said plunger are reciprocated to discharge material, actuating means for moving said valve member, and linkage means connected to said trough and to said actuating means for controlling the actuating means and movement of said valve member.

9. A combined fluid measuring and dispensing device comprising a trough, means supporting said trough for hinging movement about a horizontal axis, inlet means for directing liquid to said trough, said trough having a weir, a dispensing mechanism including a material receptacle having a dispensing opening, a movable discharge means for discharging materials from said receptacle through said discharge opening, means for actuating said movable discharge means including a cylinder, a ram within said cylinder connected to said discharge means, first and second conduits connected to said cylinder on opposite sides of said ram, a valve mechanism, said valve mechanism including a first connection adapted to connect to a source of vacuum, and second and third connections respectively connected to said first and second vacuum conduits, a valve member movable to alternately connect said first connection with said second and third connections whereupon said ram and said discharge means are reciprocated to discharge material, actuating means for moving said valve member, and linkage means connected to said trough and to said actuating means for controlling the actuating means and movement of said valve member.

WALTER R. PETERSON.

References Cited in the file of this patent

UNITED STATES PATENTS

| Number | Name | Date |
|---|---|---|
| 1,215,533 | Hoppes | Feb. 13, 1917 |
| 1,402,270 | Titterington | Jan. 3, 1922 |
| 1,505,293 | Serrell | Aug. 19, 1924 |
| 1,621,203 | Houghton | Mar. 15, 1927 |
| 2,364,488 | Swearingen | Dec. 5, 1944 |

FOREIGN PATENTS

| Number | Country | Date |
|---|---|---|
| 172,118 | Great Britain | Dec. 1, 1921 |
| 551,084 | Great Britain | Feb. 8, 1943 |